(12) United States Patent
Fujimoto et al.

(10) Patent No.: US 11,015,630 B2
(45) Date of Patent: May 25, 2021

(54) METHOD FOR ATTACHING NUT AND COLLAR TO PLATE MATERIAL AND ATTACHMENT STRUCTURE OF NUT AND COLLAR TO PLATE MATERIAL

(71) Applicants: AOYAMA SEISAKUSHO CO., LTD., Niwa-Gun (JP); FUTABA INDUSTRIAL CO., LTD., Okazaki (JP)

(72) Inventors: Yukinori Fujimoto, Niwa-Gun (JP); Kazuhiro Koga, Niwa-Gun (JP); Keiichiro Masui, Niwa-Gun (JP); Yuusuke Asai, Okazaki (JP); Masatoshi Tanabe, Okazaki (JP); Hirotaka Niinomi, Okazaki (JP)

(73) Assignees: Aoyama Seisakusho Co., Ltd., Niwa-Gun (JP); Fufaba Industrial Co., Ltd., Okazaki (JP)

( * ) Notice: Subject to any disclaimer, the term of this patent is extended or adjusted under 35 U.S.C. 154(b) by 254 days.

(21) Appl. No.: 16/253,673

(22) Filed: Jan. 22, 2019

(65) Prior Publication Data
US 2019/0226514 A1    Jul. 25, 2019

(30) Foreign Application Priority Data
Jan. 25, 2018   (JP) .............................. JP2018-010389

(51) Int. Cl.
*F16B 37/06* (2006.01)
*F16B 11/00* (2006.01)

(52) U.S. Cl.
CPC .......... *F16B 11/006* (2013.01); *F16B 37/068* (2013.01)

(58) Field of Classification Search
CPC ...... F16B 37/068; F16B 37/062; F16B 37/06; F16B 37/064; B23P 19/062; B23P 19/064
USPC ................................ 411/179–181, 533, 501
See application file for complete search history.

(56) References Cited

U.S. PATENT DOCUMENTS 3,253,631 A * 5/1966 Reusserhan ............. F16L 41/08
411/179
3,282,315 A * 11/1966 Zahodiakin ........... F16B 37/068
411/179
3,469,613 A * 9/1969 Steward ................ F16B 37/068
411/179
(Continued)

FOREIGN PATENT DOCUMENTS

CN         103851056 A       6/2014
EP         0554599 B1 *      3/1996     ............ B23P 19/062
(Continued)

OTHER PUBLICATIONS

Chinese Office Action (Application No. 201910072948.0) dated Jul. 9, 2020 (with English translation).

*Primary Examiner* — Victor D Batson
*Assistant Examiner* — Amit Singh Dhillon
(74) *Attorney, Agent, or Firm* — Burr & Brown, PLLC

(57) ABSTRACT

A nut is caulked and fixed to a plate material and a protrusion at an end of a collar is press-fitted into a recessed groove generated on the opposite surface of the plate material at the time of the caulking fixation, thereby fixing the nut and the collar to both surfaces of the plate material, respectively. The plate material is, for example, a metal panel, and the nut is, for example, a pierce nut. Since the collar is caulked and fixed, thermal strain is not generated.

6 Claims, 2 Drawing Sheets

(56) References Cited

U.S. PATENT DOCUMENTS

| | | | | |
|---|---|---|---|---|
| 3,648,747 A * | 3/1972 | Steward | F16B 37/068 | 411/179 |
| 3,810,291 A * | 5/1974 | Ladouceur | F16B 37/068 | 29/243.517 |
| 3,927,465 A * | 12/1975 | Ladouceur | F16B 37/068 | 29/509 |
| 3,969,809 A * | 7/1976 | Pouch | B23P 19/062 | 29/243.5 |
| 4,484,385 A * | 11/1984 | Woods | B23P 19/062 | 29/432.2 |
| 4,630,363 A * | 12/1986 | Woods | B23P 19/062 | 29/798 |
| 4,690,599 A * | 9/1987 | Shinjo | F16B 37/068 | 411/180 |
| 4,708,556 A * | 11/1987 | Pamer | F16B 37/068 | 411/179 |
| 5,239,740 A * | 8/1993 | Ladouceur | B23P 19/062 | 29/432 |
| 5,340,251 A * | 8/1994 | Takahashi | B21K 25/00 | 29/432.2 |
| 5,444,908 A * | 8/1995 | Kazino | B21D 39/00 | 29/243.517 |
| 7,427,180 B2 * | 9/2008 | Ladoucer | B23P 19/062 | 411/181 |
| 9,764,371 B2 * | 9/2017 | Fujimoto | B21D 53/24 | |
| 2003/0039530 A1 * | 2/2003 | Ross | F16B 37/068 | 411/181 |
| 2004/0042871 A1 * | 3/2004 | Wojciechowski | F16B 37/068 | 411/181 |
| 2005/0147481 A1 * | 7/2005 | Wojciechowski | F16B 37/065 | 411/180 |
| 2005/0158141 A1 * | 7/2005 | Shinjo | F16B 37/068 | 411/180 |
| 2005/0180838 A1 * | 8/2005 | Shinjo | F16B 37/068 | 411/179 |
| 2005/0214097 A1 * | 9/2005 | Vrana | F16B 37/068 | 411/181 |
| 2007/0224017 A1 * | 9/2007 | Pamer | F16B 37/068 | 411/162 |
| 2007/0231105 A1 * | 10/2007 | Parker | B23P 19/062 | 411/180 |
| 2014/0248104 A1 | 9/2014 | Tanaka et al. | | |

FOREIGN PATENT DOCUMENTS

| | | |
|---|---|---|
| JP | H06-042519 A1 | 2/1994 |
| JP | 2014-043883 A1 | 3/2014 |

* cited by examiner

Fig. 4 "Prior Art"

METHOD FOR ATTACHING NUT AND COLLAR TO PLATE MATERIAL AND ATTACHMENT STRUCTURE OF NUT AND COLLAR TO PLATE MATERIAL

This application claims the benefit under 35 USC § 119(a)-(d) of Japanese Application No. 2018-010389 filed Jan. 25, 2018, the entirety of which is incorporated herein by reference.

FIELD OF THE INVENTION

The present invention relates to a method for attaching a nut and a collar to a plate material and an attachment structure of a nut and a collar to a plate material.

BACKGROUND OF THE INVENTION

In the technical field of automobiles and the like, in many cases, another member is fixed by a bolt to a plate material such as a metal panel. For this purpose, a through hole is formed in the plate material, a through hole is formed also in the other member, and a bolt is inserted through these through holes to tighten the metal panel and the other member and fix with a nut. However, with this structure, it is necessary to rotate the nut on the back surface of the plate material, which causes a problem of deterioration in attachment workability.

Therefore, in this technical field, a weld nut as shown in JP H06-42519 A is widely used. The weld nut is a nut having a plurality of protrusions for welding on the bearing surface of the nut main body, and is welded and fixed to a plate material. Therefore, when attaching another member, it is sufficient to simply screw a bolt into the weld nut. Unlike a general nut, the weld nut does not have to be rotated on the back surface of the plate material or to be held so as not to rotate, which makes it possible to improve the attachment workability.

However, depending on the location for use, a cylindrical collar needs to be attached to the plate material on the back surface side of the nut for the purpose of securing the distance between the plate material to which the nut is attached and the neighboring other member. FIG. 4 is a cross-sectional view showing the state, in which reference numeral 1 denotes a nut, 2 denotes a plate material, and 3 denotes a collar. These nut 1 and collar 3 are welded to both surfaces of the plate material 2, respectively.

However, when welding is performed from both front and back surfaces at the same portion of the plate material 2 in this manner, thermal strain is likely to occur in the plate material 2 due to the thermal influence of welding. As a result of this thermal strain, the center axis of the nut 1 welded to the plate material 2 is not perpendicular to the plate material 2, and subsequent bolt fastening and attachment of another member sometimes cannot be performed smoothly.

It is also conceivable to use a pierce nut as shown in JP 2014-43883 A instead of the weld nut. The pierce nut is a nut which includes an inner cylinder and an outer cylinder on an end face of its main body having a female screw thread and which is intended to be driven into a metal panel by using a die. The pierce nut is firmly fixed to the plate material 2 by causing a metal to plastically flow into a recess formed between the inner cylinder and the outer cylinder. However, when a collar 3 is welded to the back surface of the plate material 2, there is a possibility that thermal strain may occur in the plate material 2, and, additionally, that the metal having flown into the recess of the pierce nut may be softened by the heat when welding the collar 3, thereby causing reductions in peeling strength and idling torque of the pierce nut. Further, when the plate material 2 is made of aluminum, there is also a problem that the collar 3 cannot be attached by welding.

CITATION LIST

Patent Document

Patent document 1: JP06(1994)-42519 A
Patent document 2: JP2014-43883 A

SUMMARY OF THE INVENTION

Problems to be Solved by the Invention

It is therefore an object of the present invention to provide a method for attaching a nut and a collar to a plate material, by which a nut and a collar can be firmly attached to both front and back surfaces of a plate material without generating thermal strain and regardless of the material for the plate material, and an attachment structure of a nut and a collar to a plate material.

Means for Solving the Problems

A method for attaching a nut and a collar to a plate material according to the present invention, which has been made in order to solve the above problems, is characterized by comprising caulking and fixing a nut to a plate material and press-fitting a protrusion at an end of a collar into a recessed groove generated on the opposite surface of the plate material at the time of the caulking fixation, thereby fixing the nut and the collar to both surfaces of the plate material, respectively. In a preferred embodiment, a pierce nut is caulked and fixed to a metal panel and an annular protrusion at an end of a collar is press-fitted into an annular recessed groove generated on the opposite surface of the metal panel at the time of the caulking fixation, thereby fixing the pierce nut and the collar to both surfaces of the metal panel, respectively.

An attachment structure of a nut and a collar to a plate material according to the present invention, which has been made in order to solve the above problems, is characterized by comprising a plate material, a nut caulked and fixed to a side surface of the plate material, and a collar fixed to the opposite surface thereof, and a protrusion included in the collar being intended to be press-fitted into a recessed groove formed in the plate material during the caulking fixation of the nut.

In a preferred embodiment, the nut includes an inner cylinder and an outer cylinder on an end face of its main body having a female screw thread, and a recess into which the plate material flows is formed between the inner cylinder and the outer cylinder, and the recessed groove is formed on the outer periphery of the inner cylinder of the nut. Further, in a preferred embodiment, an attachment structure of a nut and a collar to a metal panel comprises a metal panel, a pierce nut caulked and fixed to one surface of the metal panel, and a collar fixed to the opposite surface thereof, the collar includes an annular protrusion at its end, and the annular protrusion is press-fitted into an annular recessed groove formed in the metal panel at the time of the caulking fixation of the pierce nut.

Effects of the Invention

According to the present invention, firstly, the nut is caulked and fixed to the plate material using a dedicated die, and the protrusion at an end of the collar is press-fitted into the recessed groove formed on the opposite surface of the plate material at the time of the caulking fixation, thereby caulking and fixing the collar to the plate material. Therefore, welding is unnecessary, and there is no possibility of strain occurring in the plate material due to the welding heat, unlike in the prior art. Therefore, it is possible to correctly attach the nut to the plate material in a perpendicular direction. Moreover, unlike in the prior art, there is a great advantage of, for example, no possibility that the peeling strength and the idling torque of the nut may be deteriorated by the welding heat. Since welding is not performed, even when the plate material is made of aluminum, it is possible to attach the collar to the plate material. Furthermore, by attaching the collar, the attachment strength of the nut can be improved more than in the case of attaching the nut independently.

BRIEF DESCRIPTION OF THE DRAWINGS

FIG. 4 is a cross-sectional view showing a conventional technique.

DETAILED DESCRIPTION OF THE INVENTION

An embodiment of the present invention will be described below with reference to FIGS. 1 to 3.

Figure 1:
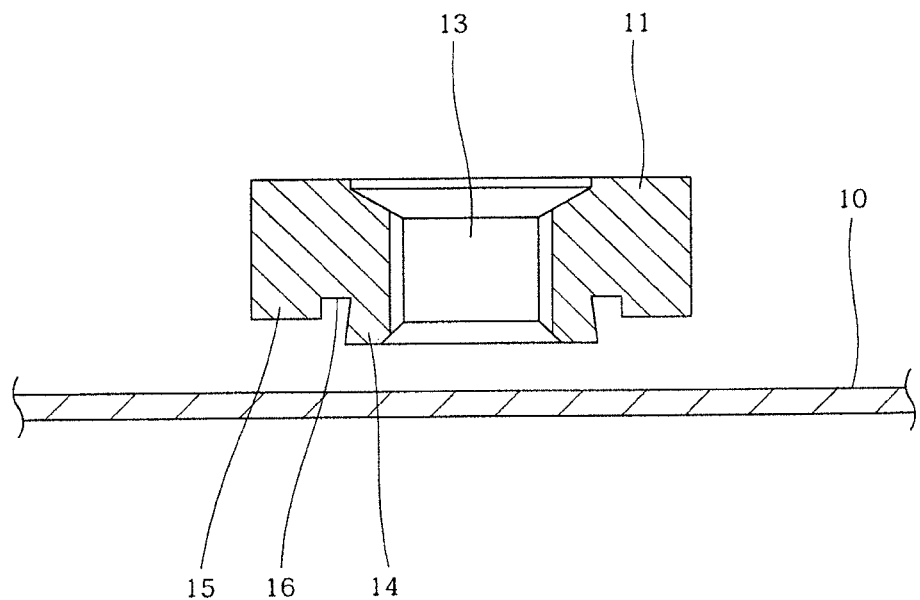
FIG. 1 is a cross-sectional view showing an embodiment of the present invention in a state before caulking.

In FIG. 1, reference numeral 10 denotes a plate material, and 11 denotes a nut to be caulked and fixed to the plate material 10. In the present embodiment, the plate material 10 is a metal panel, and the nut 11 is a pierce nut. The plate material 10 is a part of a bracket made of a steel plate used, for example, in a portion for fastening an instrument panel and a dashboard of a car. The material for the plate material 10 is not limited to the steel plate, and other materials such as an aluminum material may be used.

The nut 11 has a female screw hole 13 at the center thereof, and an inner cylinder 14 and an outer cylinder 15 provided on the bearing surface side of the nut main body. Between the inner cylinder 14 and the outer cylinder 15, a recess 16 into which a metal of the plate material 10 flows is formed at the time of caulking. In the present embodiment, the inner cylinder 14 and the outer cylinder 15 have a circular cross section perpendicular to the axis of the nut, and the recess 16 is also a circular annular recess. However, the inner cylinder 14, the outer cylinder 15, and the recess 16 are not limited to those having a circular shape in cross section, and may be polygonal such as quadrangular or hexagonal, or may be U-shaped. The outer peripheral surface of the inner cylinder 14 has a tapered shape extending toward the bearing surface. The inner cylinder 14 protrudes farther than the outer cylinder 15, and it is preferable that the protrusion amount thereof be substantially equivalent to the plate thickness of the plate material 10.

The nut 11 is driven into the plate material 10 in a state where a dedicated die (not shown) is brought into contact with the back surface of the plate material 10. At this time, the plate material 10 is punched out by the die and the inner cylinder 14, the metal at the peripheral edge of the punched-out portion plastically flows into the recess 16 of the nut 11, and the nut 11 is caulked and fixed to the plate material 10, as shown in FIG. 2.

Figure 2:
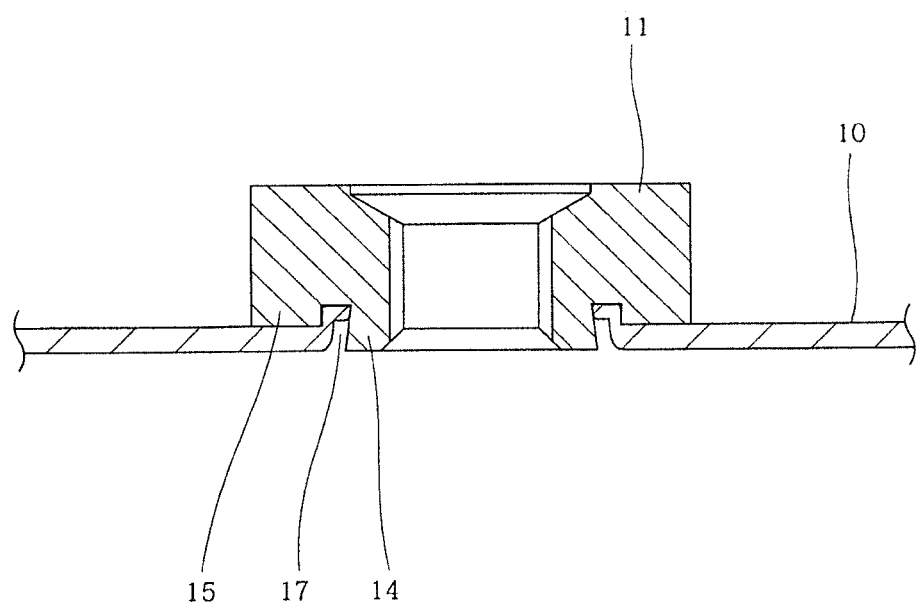
FIG. 2 is a cross-sectional view showing a state in which a nut is caulked to a plate material.

In addition, since the plate material 10 plastically flows into the recess 16 of the nut 11 as shown in FIG. 2 by the die, a recessed groove 17 is formed in the plate material 10 at the peripheral edge of the inner cylinder 14. The outer peripheral surface of the recessed groove 17 is the outer peripheral surface of the inner cylinder 14 of the pierce nut 11. In the present embodiment, the recessed groove 17 is an annular recessed groove, and its outer peripheral surface is a tapered surface.

Figure 3:
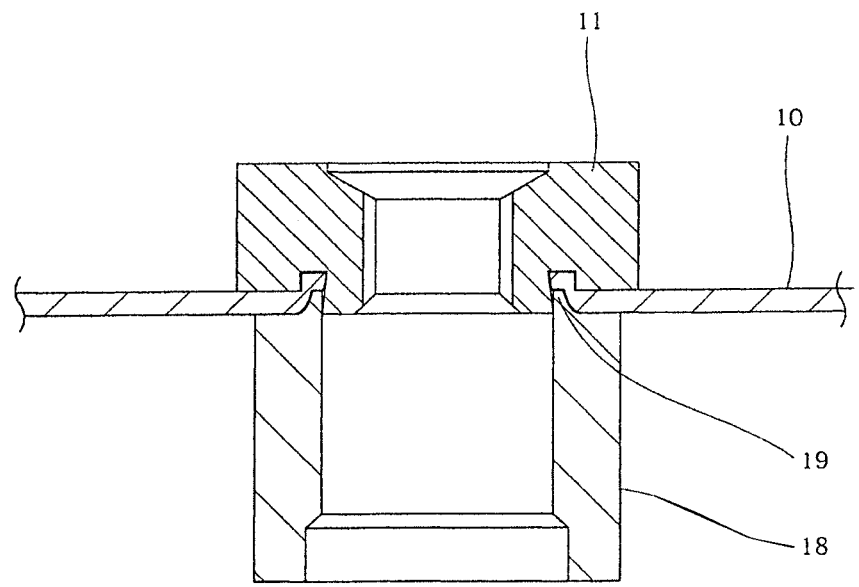
FIG. 3 is a cross-sectional view showing a state in which a collar is press-fitted into the plate material.
Figure 3:
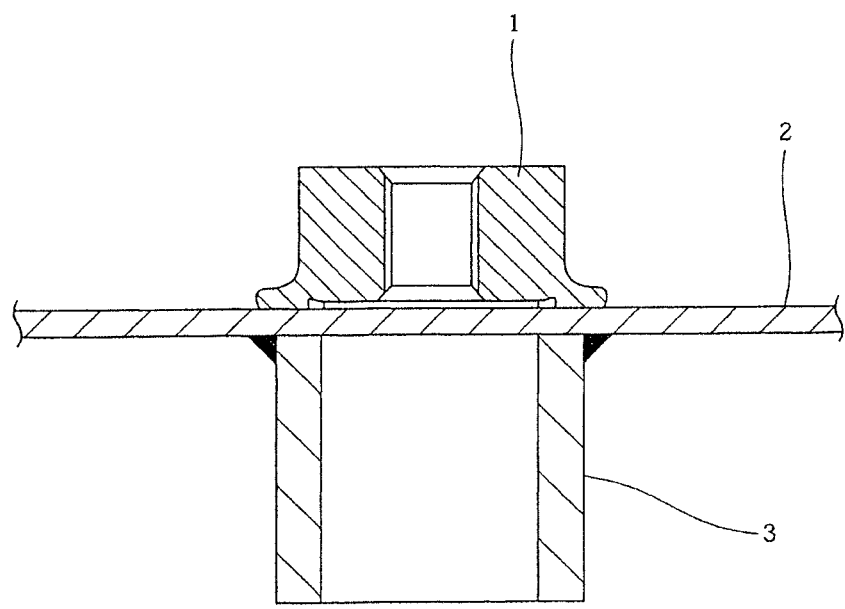

By utilizing this recessed groove 17, the collar 18 is caulked and fixed from the opposite surface of the plate material 10 as shown in FIG. 3. The collar 18 includes a protrusion 19 at an end of its cylindrical main body, and the protrusion 19 is press-fitted into the recessed groove 17 described above. The protrusion 19 of the collar 18 plastically flows into the recessed groove 17 of the pierce nut 11 and fills the inside of the recessed groove 17. In this way, the collar 18 is also firmly fixed to the metal panel 10. This also improves the attachment strength of the pierce nut 11. In this embodiment, the recessed groove 17 is an annular recessed groove, and the protrusion 19 of the collar 18 is also an annular protrusion. However, the shapes of the recessed groove 17 and the protrusion 19 are not limited to the annular shapes, and the cross-sectional shapes of the recessed groove 17 and the protrusion 19 may not necessarily be same.

As described above, according to the present invention, it is possible to firmly attach the nut 11 and the collar 18 to both surfaces of the plate material 10 without welding. Therefore, no strain occurs in the plate material 10 due to the welding heat, and the center axis of the female screw thread of the nut 11 can be made perpendicular to the plate material 10. Also, even if the material for the plate material is aluminum which is difficult to weld, the collar 18 can be attached to the plate material. Therefore, no trouble arises in the attachment of another member using the nut 11. Since the collar 18 is caulked by utilizing the recessed groove 17 generated on the opposite surface of the plate material 10 when the nut 11 is caulked and fixed, the center axis of the collar 18 can accurately coincide with the center axis of the female screw thread of the nut 11.

Furthermore, according to the present invention, the attachment strength of the nut 11 is not lowered by the welding heat, unlike in the prior art. In addition, caulking of the collar 18 can further plastically deform the portion having flown into the recessed groove 17 of the plate material 10 and provide stronger adhesion. Therefore, the attachment strength of the nut 11 can be further enhanced as compared with the case where the nut 11 is caulked independently.

In the above embodiment, the outer peripheral surface of the inner cylinder 14 of the nut 11 is tapered, but the outer peripheral surface of the inner cylinder 14 may be parallel to the axis. Further, the side surface of the recess 16 on the side of the outer cylinder 15 is parallel to the axis in the above-described embodiment, but may be a tapered surface.

EXAMPLE

In order to confirm the effect of the present invention, the following test was conducted.

A pierce nut with a diameter of 22 mm was caulked to a panel made of a steel plate having a thickness of 1.2 mm by using a dedicated die. By this caulking, an annular recessed groove having an outer diameter of 14.6 mm and a width of 1 mm was formed on the opposite surface of the metal panel. Using this annular recessed groove, a collar having an outer diameter of 20 mm, an inner diameter of 12.5 mm, and a length of 15 mm was attached. The collar had an annular protrusion having an outer diameter of 14.6 mm and a width of 1 mm on one end face of the collar, and this annular protrusion was press-fitted into the annular recessed groove of the metal panel described above by using a pressing machine.

Next, drag torque of the pierce nut was measured. The measurement was carried out by a method of using a torque sensor for measuring the torque at which the pierce nut slipped away from the metal panel and started to idle. In all the measurements, N=3. As a result, the average value of the drag torque of the pierce nut is 62.0 (N·m), and it was confirmed that the value was sufficiently higher than 35 (N·m) as the maximum fastening torque of the bolt when attaching another member to this pierce nut. Therefore, there is no possibility that the pierce nut will idle when attaching another member.

Next, the peeling strength of the press-fitted collar was measured. The measurement was carried out by a method of chucking and pulling the collar with a tensile tester and measuring the load when the collar was peeled from the metal panel to which the collar was fixed. As a result, the average value of the peeling strength of the collar from the metal panel was 1.87 (kN), and it was confirmed that the collar was firmly fixed.

As described above, according to the present invention, it is possible to firmly attach the nut and the collar without applying welding heat to the plate material. Therefore, thermal strain does not occur in the plate material, and the axis line of the female screw thread of the nut is perpendicular to the plate material. Further, even if the material for the plate material is an aluminum material, the collar can be attached without any trouble.

DESCRIPTION OF SYMBOLS 1 weld nut
2 plate material
3 collar
10 plate material
11 nut
13 female screw hole
14 inner cylinder
15 outer cylinder
16 recess
17 recessed groove
18 collar
19 protrusion

The invention claimed is:

1. A method for attaching a nut and a collar to a plate material, comprising caulking and fixing the nut to one surface of the plate material by applying a die to an opposite surface of the plate material, generating a recessed groove on the opposite surface of plate material and plastically flowing a protrusion at an end of the collar into the recessed groove on the opposite surface of the plate material, thereby fixing the nut and the collar to both surfaces of the plate material, respectively.

2. A method for attaching a pierce nut and a collar to a metal panel, comprising caulking and fixing the pierce nut to one surface of the metal panel by applying a die to an opposite surface of the metal panel, generating an annular recessed groove on the opposite surface of the metal panel and plastically flowing an annular protrusion at an end of the collar into the annular recessed groove generated on the opposite surface of the metal panel, thereby fixing the pierce nut and the collar to both surfaces of the metal panel, respectively.

3. An attachment structure of a nut and a collar and a plate material, comprising the plate material, the nut caulked and fixed to one surface of the plate material, and the collar fixed to an opposite surface of the plate material, wherein the collar is a member fixed to the plate material in order to secure a distance between the plate material and a neighboring other member and the collar has a protrusion that is plastically flowed into a recessed groove formed on a periphery of an inner cylinder of the nut.

4. The attachment structure of the nut and the collar and the plate material according to claim 3, wherein the nut has a female screw thread and includes the inner cylinder and an outer cylinder on an end face of a main body of the nut, wherein a recess into which the plate material flows is formed between the inner cylinder and the outer cylinder, and the recessed groove is formed on the periphery of the inner cylinder of the nut.

5. An attachment structure of a pierce nut and a collar and a metal panel, comprising the metal panel, the pierce nut caulked and fixed to one surface of the metal panel, and the collar fixed to an opposite surface of the metal panel, the collar including an annular protrusion at an end of the collar, wherein the collar is a member fixed to the metal panel in order to secure a distance between the metal panel and a neighboring other member and the annular protrusion is plastically flowed into an annular recessed groove formed on a periphery of an inner cylinder of the pierce nut.

6. The attachment structure of the pierce nut and the collar and the metal panel according to claim 5, wherein the pierce nut has a female screw thread and includes the inner cylinder and an outer cylinder on an end face of a main body of the pierce nut, wherein a recess into which the metal panel flows is formed between the inner cylinder and the outer cylinder, and the annular recessed groove is formed on the periphery of the inner cylinder of the pierce nut.

* * * * *

UNITED STATES PATENT AND TRADEMARK OFFICE
CERTIFICATE OF CORRECTION

| | | |
|---|---|---|
| PATENT NO. | : 11,015,630 B2 | Page 1 of 1 |
| APPLICATION NO. | : 16/253673 | |
| DATED | : May 25, 2021 | |
| INVENTOR(S) | : Fujimoto et al. | |

It is certified that error appears in the above-identified patent and that said Letters Patent is hereby corrected as shown below:

On the Title Page

<u>Assignees, Item (73)</u>
Change: "Assignees: Aoyama Seisakusho Co., Ltd., Niwa-Gun (JP), Fufaba Industrial Co., Ltd., Okazaki (JP)" to -- Assignees: Aoyama Seisakusho Co., Ltd., Niwa-Gun (JP), Futaba Industrial Co., Ltd., Okazaki (JP) --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*